(12) United States Patent
Hanzawa et al.

(10) Patent No.: US 10,070,599 B2
(45) Date of Patent: Sep. 11, 2018

(54) PLANT CULTIVATION APPARATUS

(71) Applicant: Panasonic Intellectual Property Management Co., Ltd., Osaka (JP)

(72) Inventors: Fumio Hanzawa, Fukushima (JP); Masahiko Kaide, Osaka (JP); Hiroshi Kageyama, Fukushima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 212 days.

(21) Appl. No.: 14/908,766

(22) PCT Filed: Mar. 11, 2015

(86) PCT No.: PCT/JP2015/001330
§ 371 (c)(1),
(2) Date: Jan. 29, 2016

(87) PCT Pub. No.: WO2015/136926
PCT Pub. Date: Sep. 17, 2015

(65) Prior Publication Data
US 2016/0157447 A1 Jun. 9, 2016

(30) Foreign Application Priority Data
Mar. 14, 2014 (JP) ................... 2014-051534

(51) Int. Cl.
*A01G 31/00* (2018.01)
*A01G 31/02* (2006.01)
(Continued)

(52) U.S. Cl.
CPC ............ *A01G 31/02* (2013.01); *A01G 9/246* (2013.01); *A01G 9/247* (2013.01); *A01G 31/06* (2013.01); *Y02P 60/216* (2015.11)

(58) Field of Classification Search
USPC .......... 47/60, 65, 65.5, 62 R, 59 R, 66.7, 79
See application file for complete search history.

(56) References Cited

U.S. PATENT DOCUMENTS 2,815,966 A * 12/1957 House ............. F16L 17/10
277/605
3,222,076 A * 12/1965 Hollingsworth ...... F16L 17/10
277/605
(Continued)

FOREIGN PATENT DOCUMENTS

JP 62-118834 5/1987
JP 2005-34043 * 2/2005 ............... A01G 9/24
(Continued)

OTHER PUBLICATIONS

International Search Report dated Jun. 9, 2015 in corresponding International Application No. PCT/JP2015/001330 (with English translation).

*Primary Examiner* — Abdrea M Valenti
(74) *Attorney, Agent, or Firm* — Wenderoth, Lind & Ponack, L.L.P.

(57) ABSTRACT

A plant cultivation apparatus includes a cultivation unit including a cultivation bed that includes a recess having a recessed cross-sectional shape and being configured to receive cultivation liquid injected into the recess, and a cultivation plate on the cultivation bed. The cultivation plate is supported on the recess of the cultivation bed, and includes an air supply path defined inside the cultivation plate, an air intake port through which air is supplied to the air supply path, and an air discharge port connecting with the air supply path and defined on an upper surface side of the cultivation plate where a cultivation plant is disposed. The cultivation bed includes an air intake port through which air is introduced and guided to the air supply path of the (Continued)

cultivation plate, and an air discharge port connectable with the air intake port of the cultivation plate.

6 Claims, 7 Drawing Sheets

(51) Int. Cl.
  *A01G 31/06*    (2006.01)
  *A01G 9/24*    (2006.01)

(56) References Cited

U.S. PATENT DOCUMENTS

| | | | | |
|---|---|---|---|---|
| 3,360,273 | A * | 12/1967 | Hundt | F16L 17/10 |
| | | | | 264/267 |
| 4,945,821 | A * | 8/1990 | Holmberg | A01G 9/241 |
| | | | | 454/250 |
| 5,188,288 | A * | 2/1993 | Demerritt | A01G 9/245 |
| | | | | 126/91 A |
| 2004/0255513 | A1* | 12/2004 | Becker | A01G 9/00 |
| | | | | 47/65.9 |
| 2006/0162246 | A1* | 7/2006 | Okabe | A01G 9/16 |
| | | | | 47/1.01 R |
| 2010/0126063 | A1* | 5/2010 | Emoto | A01G 7/045 |
| | | | | 47/39 |

FOREIGN PATENT DOCUMENTS

| | | | | |
|---|---|---|---|---|
| JP | 2011-217729 | | 11/2011 | |
| JP | 2012-000028 | * | 1/2012 | A01G 7/00 |
| JP | 2012-28 | | 1/2012 | |

* cited by examiner

PLANT CULTIVATION APPARATUS

TECHNICAL FIELD

The present technology relates to a plant cultivation apparatus used in a factory for cultivating vegetables or other plants.

BACKGROUND ART

Unexamined Japanese Patent Publication No. 2012-28 discloses a technology relating to a plant cultivation facility. The plant cultivation facility disclosed in Unexamined Japanese Patent Publication No. 2012-28 includes a cultivation bed where plants are cultivated, a cultivation panel which includes a plurality of vent holes formed in a thickness direction of the panel, and overlaps with the cultivation bed on the side above the bed with a clearance left between the panel and the bed, and an air conditioning mechanism which introduces gas into the clearance between the cultivation bed and the cultivation panel.

SUMMARY OF THE INVENTION

A plant cultivation apparatus according to the present technology includes a cultivation unit. The cultivation unit includes a cultivation bed that includes a recess having a recessed cross-sectional shape and receiving cultivation liquid injected into the recess, and a cultivation plate provided on the cultivation bed. The cultivation plate is supported by the recess of the cultivation bed, and includes an air supply path formed inside the cultivation plate, an air intake port through which air is supplied to the air supply path, and an air discharge port connecting with the air supply path and formed on an upper surface side of the cultivation plate where a cultivation plant is disposed. The cultivation bed includes an air intake port through which air is introduced and guided to the air supply path of the cultivation plate, and an air discharge port connectable with the air intake port of the cultivation plate. The plant cultivation apparatus further includes an elastic member that elastically presses the air intake port of the cultivation plate against the air discharge port of the cultivation bed to connect the air intake port of the cultivation plate and the air discharge port of the cultivation bed.

DESCRIPTION OF EMBODIMENTS

A plant cultivation apparatus according to an exemplary embodiment of the present technology is hereinafter described with reference to the drawings. However, an unnecessarily detailed description may be omitted. For example, detailed description of well-known matters, or repeated description of substantially identical configurations may be omitted. These omissions are made for avoiding unnecessary redundancy of the following description, and helping easy understanding by those skilled in the art. The accompanying drawings and the following description are presented not for the purpose of setting any limitations to subject maters defined in the appended claims, but only for the purpose of helping those skilled in the art fully understand the present technology.

Figure 1:
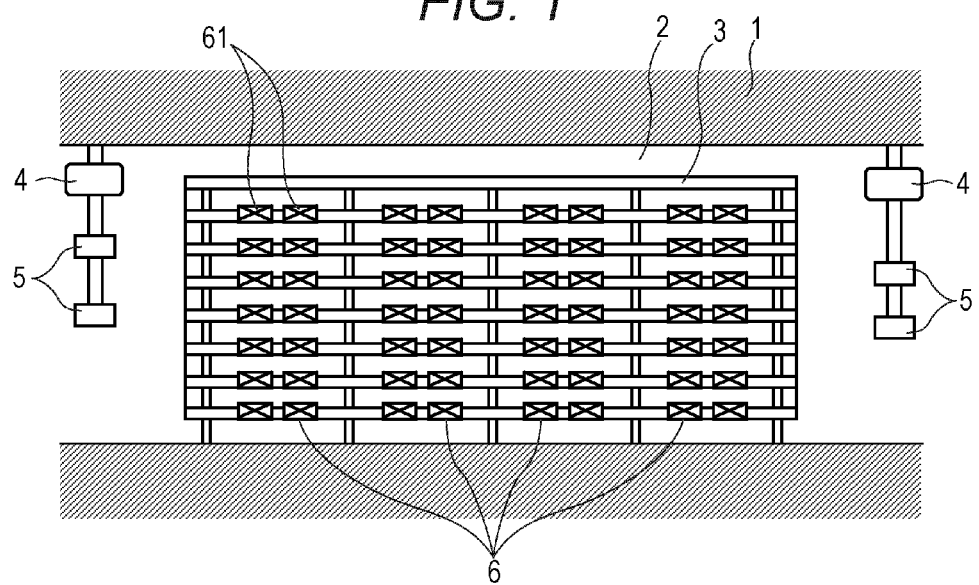
FIG. 1 is a schematic view illustrating a general configuration of a plant cultivation apparatus according to an exemplary embodiment of the present technology.
Figure 2:
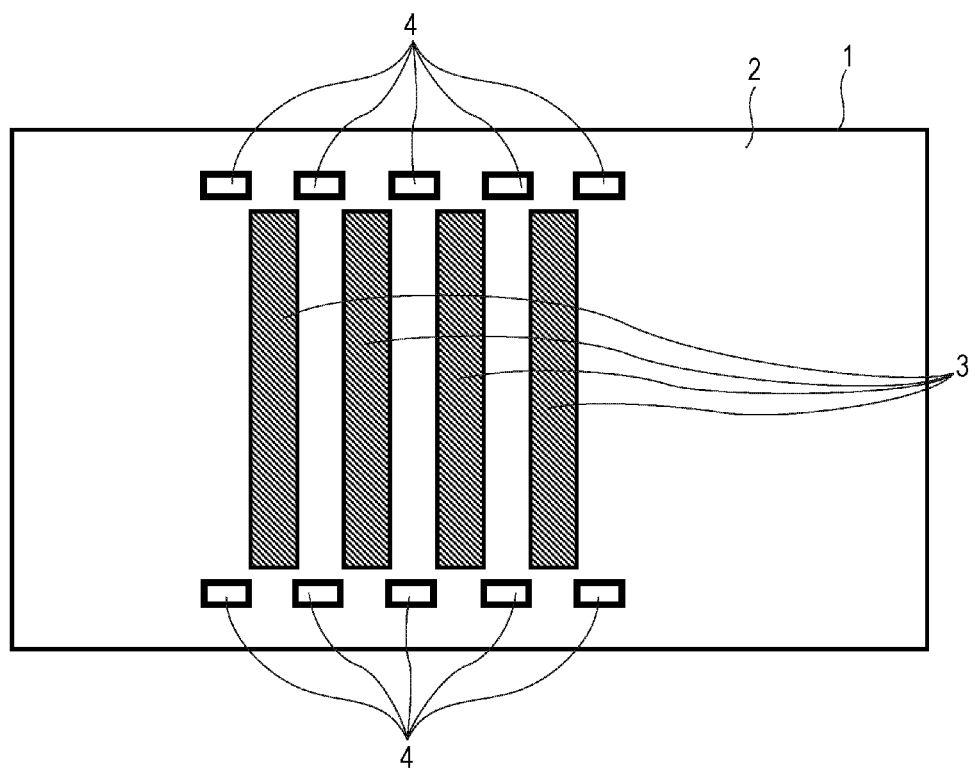
FIG. 2 is a schematic view illustrating a configuration of the plant cultivation apparatus as viewed from above in FIG. 1.
Figure 3:
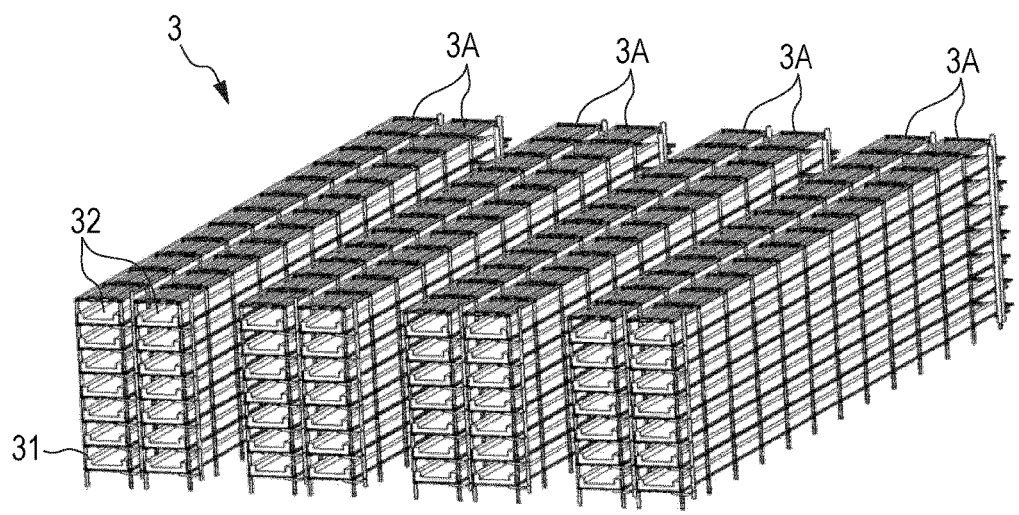
FIG. 3 is a perspective view illustrating a part of cultivation shelves of the plant cultivation apparatus according to the exemplary embodiment of the present technology illustrated in FIG. 1.
Figure 4:
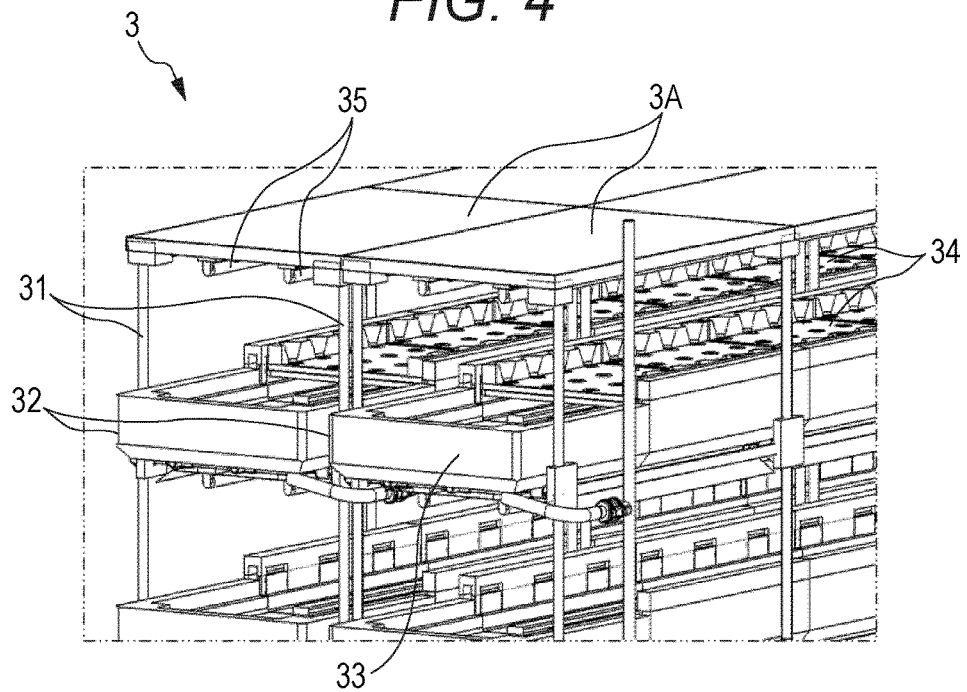
FIG. 4 is a perspective view illustrating an enlarged main part of the cultivation shelves.

FIG. 1 is a schematic view illustrating a general configuration of a plant cultivation apparatus according to an exemplary embodiment of the present technology. FIG. 2 is a schematic view illustrating a configuration of the plant cultivation apparatus as viewed from above in FIG. 1. FIG. 3 is a perspective view illustrating a part of cultivation shelves included in the plant cultivation apparatus according to the exemplary embodiment of the present technology illustrated in FIG. 1. FIG. 4 is a perspective view illustrating an enlarged main part of the cultivation shelves.

As illustrated in FIGS. 1 and 2, cultivation facility 1 such as a building and a plastic greenhouse includes cultivation space 2 where cultivation environments such as temperature, humidity, and light are controllable. A plurality of cultivation shelves 3 are provided within cultivation space 2 with a predetermined clearance left between one another to constitute the plant cultivation apparatus.

Cultivation space 2 contains a plurality of air conditioners 4 such as coolers. Air conditioners 4 are disposed on both sides of each of cultivation shelves 3 in an upper region of cultivation space 2 to supply airflow toward the sides of cultivation shelves 3. The airflow is a flow of air under temperature control, such as cool air. As illustrated in FIG. 1, induced draft fans 5 are provided at least immediately below air conditioners 4 disposed at ends of cultivation space 2 to guide the airflow such as cool air upward after the airflow is supplied from air conditioners 4. According to this structure, the airflow supplied from air conditioners 4 is induced to flow toward cultivation shelves 3 by induced draft fans 5. The clearance between adjacent cultivation shelves 3 may be arbitrarily determined as long as an administrator of cultivation is allowed to pass between cultivation shelves 3. Air conditioners 4 are disposed in such positions as to generate airflow under temperature control such as cool air toward both the sides of cultivation shelves 3.

As illustrated in FIGS. 3 and 4, each of cultivation shelves 3 includes supports 31 constituting a plurality of stages of shelves. Each of supports 31 is a pipe made of metal or plastic. A plurality of stages of cultivation units 32 are stacked on the plurality of stages of supports 31 one for each, and are vertically disposed with a clearance left between one another. According to the example illustrated in FIG. 3, the plurality of stages of vertically stacked cultivation units 32 form one cultivation block 3A. One cultivation shelf 3 is constituted by two cultivation blocks 3A.

Each of cultivation units 32 includes cultivation bed 33, a plurality of cultivation plates 34 disposed above cultivation bed 33, and illumination devices 35 disposed above cultivation plates 34. Each of illumination devices 35 contains a fluorescent light, an LED or the like. While not shown in the figure, shielding members are provided on sides of cultivation unit 32.

As illustrated in FIG. 1, suction equipment 6 is provided in the vicinity of respective cultivation units 32 of cultivation shelf 3. Suction equipment 6 is constituted by suction fans 61 for sucking airflow such as cool air generated by air conditioners 4. Cool air generated by air conditioners 4 in FIG. 1 is guided toward the sides of cultivation shelf 3 by induced draft fans 5, and further guided into cultivation beds 33 by suction fans 61 provided on respective cultivation units 32. Then, the cool air is guided along air supply paths of cultivation plates 34 to vicinities of cultivation plants (such as lettuces). According to this structure, temperatures within respective cultivation units 32 disposed on the plurality of stages of cultivation shelf 3 become more uniform with supply of the cool air guided in this manner.

According to the example illustrated in FIG. 1, air conditioners 4 are suspended from a ceiling of cultivation space 2. Induced draft fans 5 are so disposed as to guide airflow of air conditioners 4 toward a highest possible region. In this arrangement of induced draft fans 5, temperatures become more uniform throughout the sides of cultivation shelf 3. Each of cultivation units 32 includes suction equipment 6 such as a suction fan.

As illustrated in FIG. 2, air conditioners 4 are so disposed as to guide airflow into each of the clearances between respective cultivation shelves 3 located in parallel. Each of air conditioners 4 may be an air conditioner producing one horsepower to ten horsepower.

This arrangement of air conditioners 4, induced draft fans 5, and suction equipment 6 efficiently guide airflow toward the sides of cultivation shelves 3 even when each of air conditioners 4 is constituted by a cooler producing low horsepower. Accordingly, cost reduction of the plant cultivation apparatus is realizable by using low-cost air conditioners 4.

Each of cultivation units 32 is hereinafter described with reference to FIGS. 5 through 10.

Figure 5:
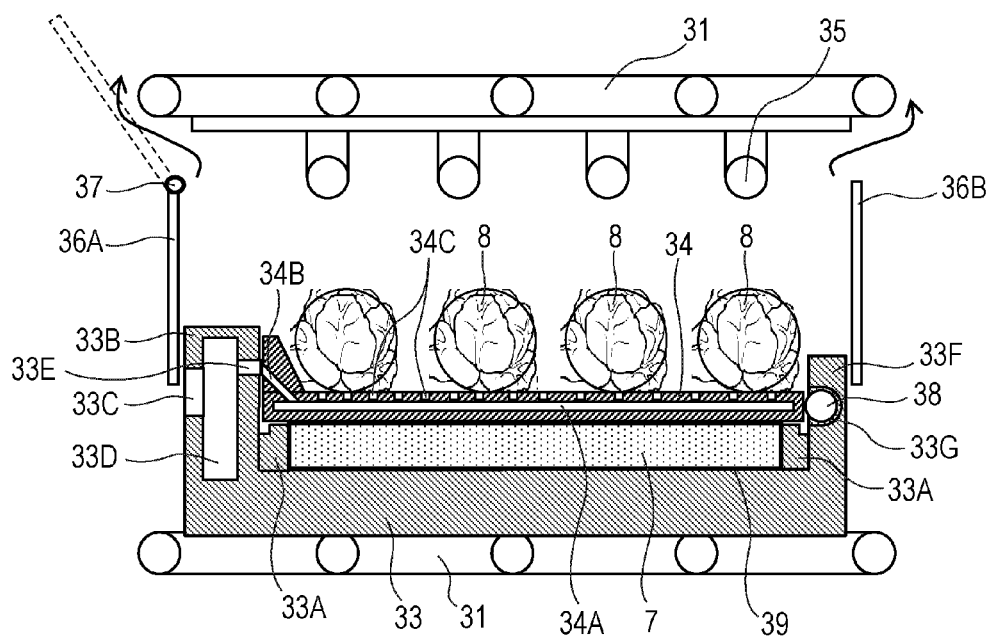
FIG. 5 is a cross-sectional view illustrating a configuration of a cultivation unit.
Figure 6:
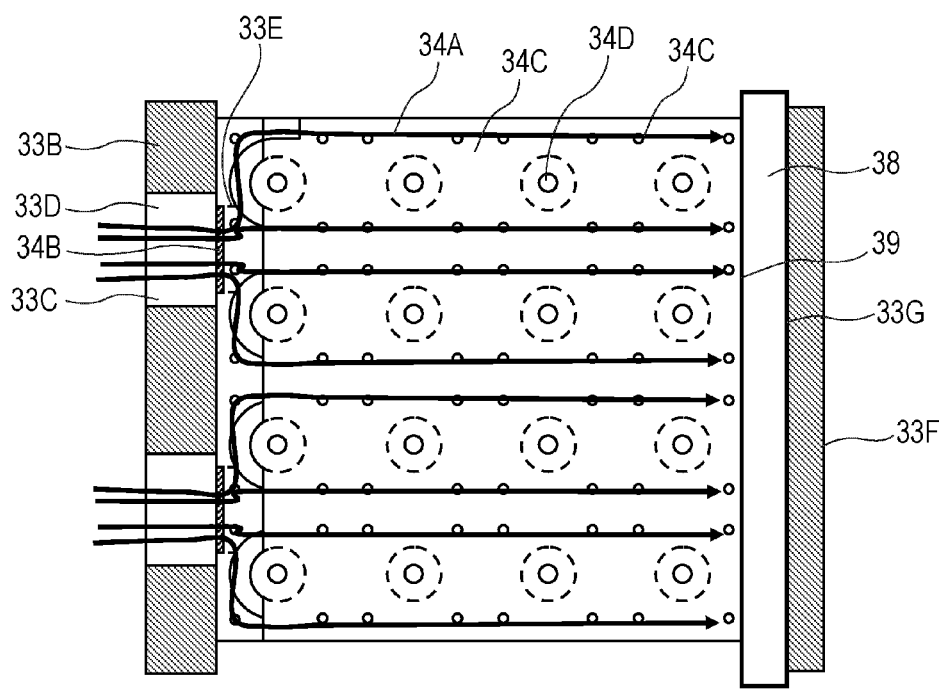
FIG. 6 is a plan view illustrating the configuration of the cultivation units.

FIG. 5 is a cross-sectional view illustrating a configuration of cultivation unit 32. FIG. 6 is a plan view illustrating the configuration of cultivation unit 32. Arrows in FIG. 6 indicate flows of air.

Cultivation unit 32 is supported on support 31 constituting cultivation shelf 3. Illumination devices 35 are attached to support 31 provided in an upper region. Shielding members 36A and 36B are so disposed as to shield the sides of cultivation unit 32. An upper part of each of shielding members 36A and 36B is opened to form a clearance through which air flows as indicated by arrows in FIG. 5. This airflow releases heat generated from illumination devices 35. Shielding member 36A is attached to support 31 via hinge 37 in a manner openable and closable by a user as indicated by a dotted line in FIG. 5. Shielding member 36B is attached to support 31.

As illustrated in FIG. 5, cultivation bed 33 is supported on support 31. Cultivation bed 33 has a bottomed box shape forming a recess in the cross-sectional view. Cultivation bed 33 is made of styrene foam corresponding to a type of polystyrene. Cultivation bed 33 is configured to receive cultivation liquid 7 such as nourishing solution injected into the recess of cultivation bed 33. Regulation portions 33A for holding cultivation plate 34 are provided in the recess of cultivation bed 33 so that cultivation plate 34 can be held within the recess of cultivation bed 33. Regulation portions 33A prevent lowering of cultivation plate 34 to a predetermined level or lower even when a weight of cultivation plants 8 disposed on cultivation plate 34 increases. When cultivation plate 34 lowers to the predetermined level or lower, liquid 7 may flow toward an upper surface of cultivation plate 34. This flow of liquid 7 may cause problems such as damage to growth of cultivation plants 8. However, regulation portions 33A provided on cultivation bed 33 prevent these problems.

Rib 33B formed at an end of cultivation bed 33 includes air intake ports 33C for introducing air such as cool air, and air supply paths 33D for guiding air introduced through air intake ports 33C to guide air such as cool air toward air supply paths 34A formed inside cultivation plate 34 after the air is introduced by suction equipment 6 such as a suction duct and a suction fan. The air guided into air supply paths 33D of cultivation bed 33 is introduced toward air supply paths 34A via air intake ports 34B of cultivation plate 34. Air intake ports 34B are connectable with air discharge ports 33E formed in rib 33B. Air intake ports 33C, air supply paths 33D, and air discharge ports 33E of cultivation bed 33 are detailed below.

Substantially circular-arc-shaped groove 33G is formed in rib 33F of cultivation bed 33 on the side opposite to rib 33B including air intake ports 33C, air supply paths 33D, and air discharge ports 33E. Groove 33G houses cylindrical tube 38 made of rubber and constituting an elastic member. Tube 38 elastically presses air intake ports 34B of cultivation plate 34 against air discharge ports 33E of cultivation bed 33 to connect air intake ports 34B and air discharge ports 33E.

A blower is connected with tube 38 to supply air into tube 38 and expand tube 38 with supplied air. Tube 38 expands with supply of air from the blower to elastically press air intake ports 34B of cultivation plate 34 against air discharge ports 33E of cultivation bed 33 for connection between air intake ports 34B and air discharge ports 33E.

As illustrated in FIG. 6, tube 38 is disposed such that an outer surface of tube 38 in the longitudinal direction comes into contact with an end of cultivation plate 34 on the side opposite to the side of air intake ports 34B of cultivation plate 34. In this case, tube 38 expands within groove 33G with supply of air from the blower into tube 38 to elastically press air intake ports 34B of cultivation plate 34 against air discharge ports 33E of cultivation bed 33, and connect air intake ports 34B and air discharge ports 33E. Accordingly, air is supplied to air supply paths 34A of cultivation plate 34 in a stable manner via air intake ports 34B. Hydroponic sheet 39 is provided on the recess of cultivation bed 33 into which liquid 7 is injected.

According to this exemplary embodiment, cultivation unit 32 includes the plurality of cultivation plates 34 above cultivation bed 33. Cultivation plates 34 are movable in the longitudinal direction. The plurality of cultivation plates 34 are pressed by tube 38 against predetermined positions of cultivation bed 33 toward the rib 33B side to connect air discharge ports 33E of cultivation bed 33 and air intake ports 34B of cultivation plate 34 and supply air to air supply paths 34A of cultivation plate 34 via air intake ports 34B.

As illustrated in FIG. 6, cultivation plate 34 is made of styrene foam corresponding to a type of polystyrene, and includes air supply paths 34A formed inside cultivation plate 34, air intake ports 34B through which air is supplied to air supply paths 34A, and air discharge ports 34C connecting with air supply paths 34A and formed on the upper surface side of cultivation plate 34 where cultivation plants 8 are disposed. Cool air entering air intake ports 34B passes along air supply paths 34A, and flows out from air discharge ports 34C. Each of discharge ports 34C is constituted by a through hole opened to above and below, and configured to apply cool air from below to cultivation plants 8 cultivated on cultivation plate 34. A plurality of cultivation holes 34D penetrating in an up-down direction are formed in cultivation plate 34 on the upper surface side thereof where air discharge ports 34C are formed. Cultivation plants 8 are positioned at respective cultivation holes 34D.

As illustrated in FIG. 6, air such as cool air introduced through air intake ports 33C of cultivation bed 33 by the suction equipment such as a suction duct and a suction fan and passing through air supply paths 33D and air discharge ports 33E is introduced into air intake ports 34B of cultivation plate 34. The air introduced through air intake ports 34B of cultivation plate 34 passes through air supply paths 34A, and flows out from air discharge ports 34C toward above cultivation plate 34. Air supply paths 34A may be arbitrarily determined as long as air can be discharged through air discharge ports 34C.

Figure 7:
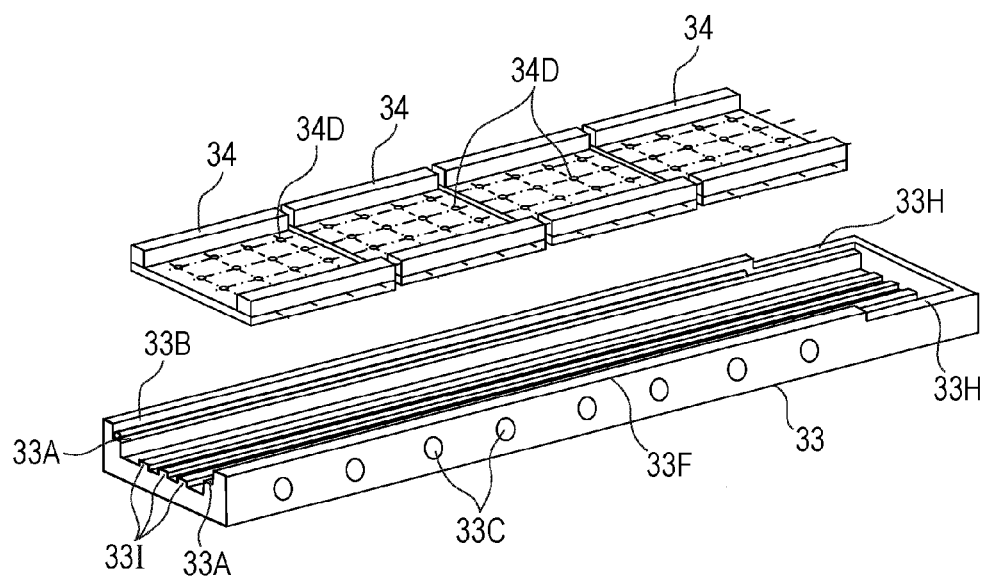
FIG. 7 is a perspective view illustrating a state of a cultivation bed from which cultivation plates are removed.
Figure 8:
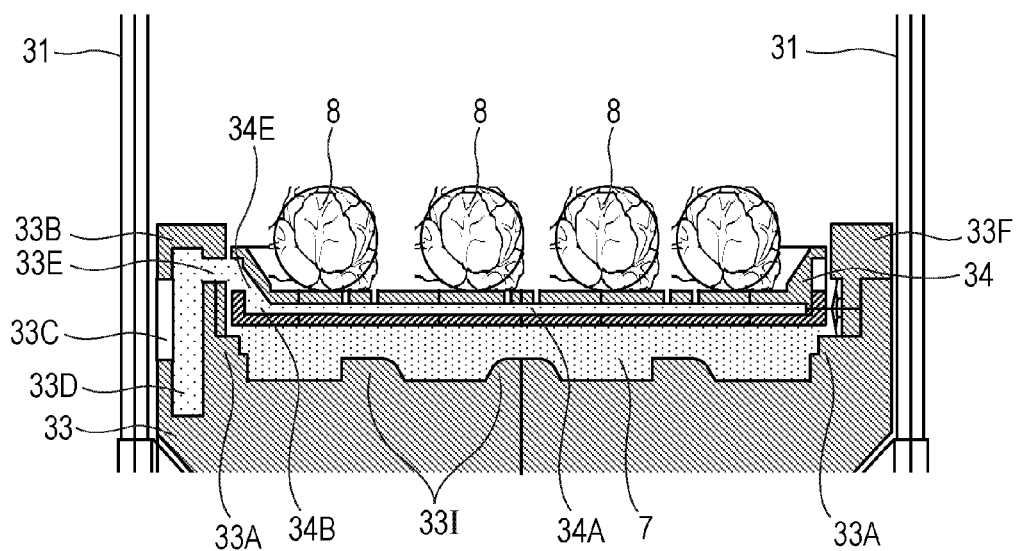
FIG. 8 is a cross-sectional view illustrating a detailed structure of the cultivation bed.

FIG. 7 is a perspective view illustrating a state of cultivation bed 33 from which cultivation plates 34 are removed. FIG. 7 does not show one of the sides of cultivation bed 33 in the longitudinal direction. FIG. 8 is a cross-sectional view illustrating a detailed structure of the cultivation bed.

As illustrated in FIG. 7, cultivation bed 33 has a substantially rectangular shape. Ribs 33B and 33F are formed in an upper portion of cultivation bed 33. The plurality of cultivation plates 34 are disposed side by side along ribs 33B and 33F. Ribs 33H having a height smaller than each height of ribs 33B and 33F are further provided on a part of the upper portion of cultivation bed 33. Ribs 33H are provided to facilitate removal of cultivation plates 34 by a user. This structure allows easy removal of cultivation plates 34 from the sides of cultivation shelf 3 even when ducts or the like are provided on cultivation shelf 3.

As illustrated in FIG. 8, handle 34E is provided on the side of cultivation plate 34 to facilitate removal of cultivation plate 34 from cultivation bed 33. Handle 34E constitutes a part of air intake port 34B of cultivation plate 34.

Cultivation plates 34 are movable with respect to cultivation bed 33. Dummy plates are provided at ends in a moving direction of cultivation plates 34 to position respective cultivation plates 34. Accordingly, the plurality of cultivation plates 34 are disposed in such a state that respective positions of cultivation plates 34 are regulated with respect to cultivation bed 33.

As illustrated in FIG. 8, projections 33I are formed on a bottom of cultivation bed 33. Projections 33I increase strength of cultivation bed 33, and reduce an amount of liquid 7 injected into cultivation bed 33.

Figure 9:
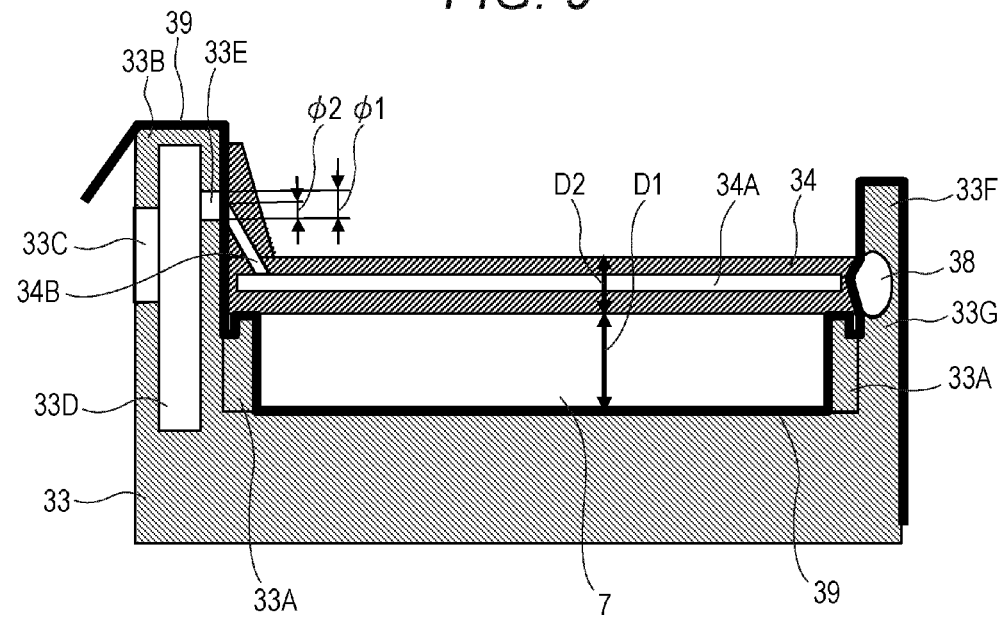
FIG. 9 is an explanatory view illustrating a relationship between the cultivation bed and the cultivation plate.

FIG. 9 is an explanatory view illustrating a relationship between cultivation bed 33 and cultivation plate 34. In FIG. 9, D1 indicates a height from the bottom of cultivation bed 33 to regulation portions 33A, i.e., to a lower surface of cultivation plate 34. Further, D2 indicates a thickness of cultivation plate 34.

In FIG. 9, cultivation liquid 7 injected into cultivation bed 33 is regulated to a level not reaching an upper surface of cultivation plate 34. More specifically, cultivation liquid 7 injected into cultivation bed 33 is regulated to a level lower than D1+D2. In this case, overflow of cultivation liquid 7 such as nourishing solution toward the upper surface of cultivation plate 34 is avoidable, wherefore air supplied to air supply paths 34A of cultivation plate 34 securely reaches the upper surface of cultivation plate 34 without adverse effect on growth of cultivation plants 8 resulting from overflow of cultivation liquid 7.

Air intake ports 34B of cultivation plate 34 are positioned higher than the level of cultivation liquid 7 injected into cultivation bed 33. Opening diameter $\varphi 1$ of each of air discharge ports 33E of cultivation bed 33 is larger than opening diameter $\varphi 2$ of each of air intake ports 34B of cultivation plate 34. This structure securely connects air discharge ports 33E of cultivation bed 33 with air intake ports 34B formed for supplying air to air supply paths 34A of cultivation plate 34 even when the level of cultivation liquid 7 such as nourishing solution varies. Accordingly, air under temperature control can be supplied toward cultivation plate 34 in a stable manner.

Figure 10:
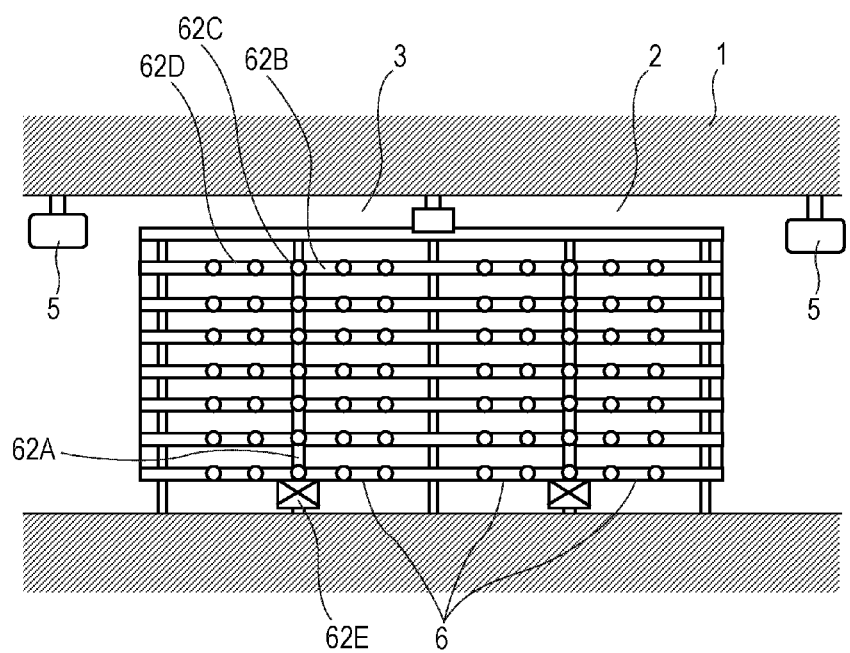
FIG. 10 is a schematic view illustrating a general configuration of a plant cultivation apparatus according to another exemplary embodiment of the present technology.
Figure 11:
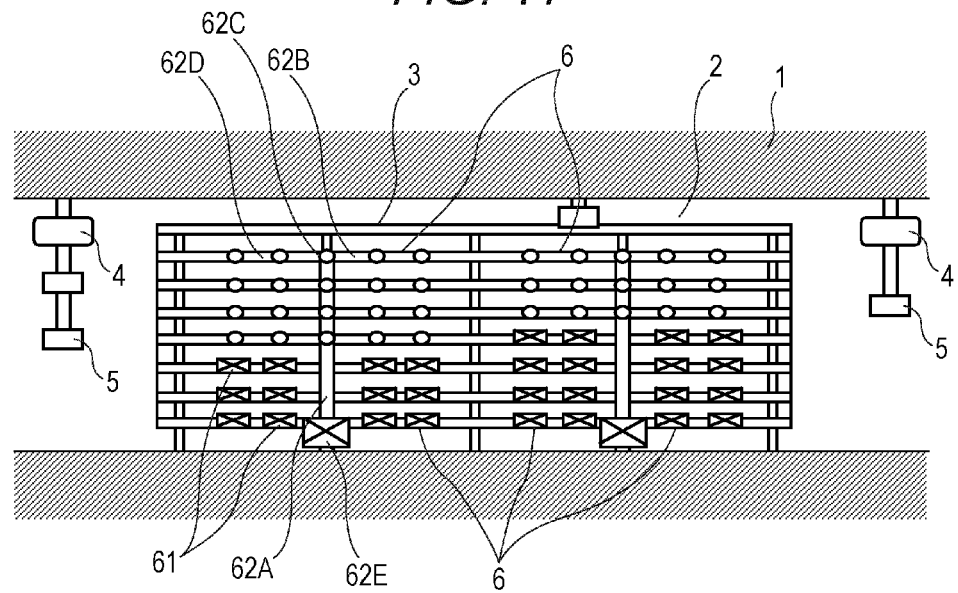
FIG. 11 is a schematic view illustrating a general configuration of a plant cultivation apparatus according to still another exemplary embodiment of the present technology.
Figure 12:
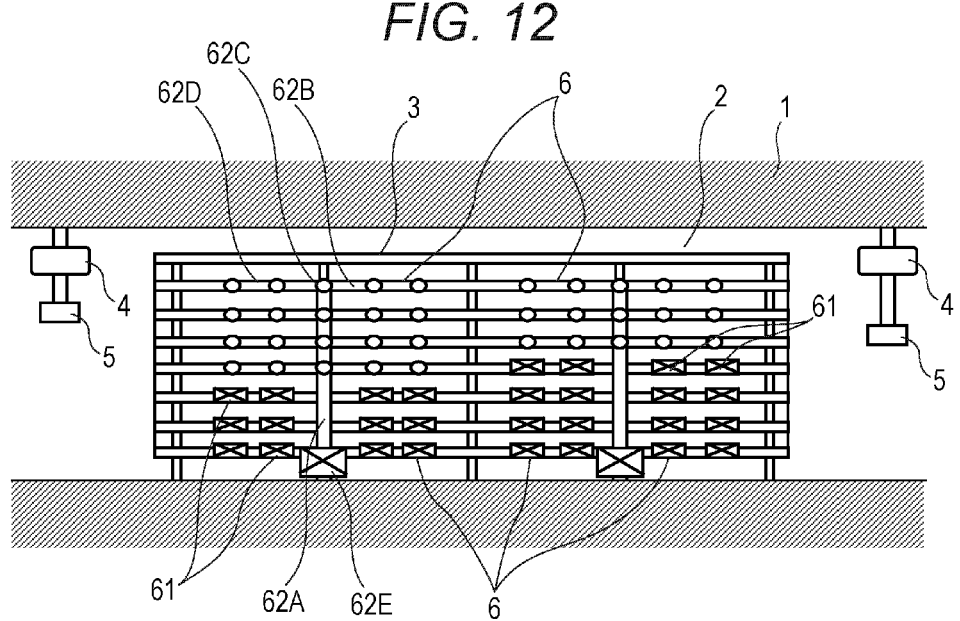
FIG. 12 is a schematic view illustrating a general configuration of a plant cultivation apparatus according to yet another exemplary embodiment of the present technology.

FIGS. 10, 11, and 12 are schematic views illustrating general configurations of plant cultivation apparatuses according to other exemplary embodiments of the present technology.

According to the exemplary embodiment illustrated in FIG. 10, induced draft fans 5 are only provided at the ends of cultivation space 2 to allow cool air supplied from air conditioners 4 to flow throughout cultivation space 2. Suction equipment 6 provided on cultivation shelf 3 is constituted by suction ducts, and configured to guide air such as cool air staying in a lower region of cultivation space 2 toward above cultivation shelf 3 by using the suction ducts. More specifically, according to the example illustrated in FIG. 10, the suction ducts constituting suction equipment 6 includes up-down ducts 62A, branch ducts 62B, left-right ducts 62C, and suction ducts 62D. In this structure, air such as cool air staying in the lower region of cultivation space 2 is sucked by suction portions 62E, and guided toward cultivation units 32 in an upper part of cultivation shelf 3 via up-down ducts 62A, branch ducts 62B, left-right ducts 62C, and suction ducts 62D. Accordingly, temperatures within respective cultivation units 32 provided on the plurality of stages of cultivation shelf 3 become more uniform by introduction of the cool air in this manner.

According to the exemplary embodiment illustrated in FIG. 11, the plurality of induced draft fans 5 are provided immediately below air conditioners 4 disposed at the ends of cultivation space 2 to control airflow of air conditioners 4. This structure guides cool air to more preferable positions of the sides of cultivation shelf 3. Moreover, suction equipment 6 constituted by suction fans 61 is provided in a lower part of cultivation shelf 3, while up-down ducts 62A, branch ducts 62B, left-right ducts 62C, and suction ducts 62D are provided in the upper part of cultivation shelf 3. Air such as cool air staying in the lower region of cultivation space 2 is sucked by suction portions 62E, and guided toward cultivation units 32 in the upper part of cultivation shelf 3 via up-down ducts 62A, branch ducts 62B, left-right ducts 62C, and suction ducts 62D.

According to this structure, air such as cool air staying in the lower part of cultivation space 2 is sucked by suction portions 62E, and guided by up-down ducts 62A, branch ducts 62B, left-right ducts 62C, and suction ducts 62D toward cultivation units 32 disposed in the upper part of cultivation shelf 3. It is preferable that positions of the suction fans and the suction ducts are appropriately adjusted in accordance with the air flowing along the sides of cultivation shelf 3. Cool air generally stays in the lower part, wherefore it is preferable that the suction fans are positioned below the suction ducts. Accordingly, temperatures within respective cultivation units 32 provided on the plurality of stages of cultivation shelf 3 become more uniform by introduction of the cool air in this manner.

According to the exemplary embodiment illustrated in FIG. 12, the plurality of induced draft fans 5 are disposed immediately below air conditioners 4 provided at the ends of cultivation space 2. Airflow generated by air conditioners 4 is guided upward by induced draft fans 5, and flows in such a direction as to form a circle at the center of each side of cultivation shelf 3. According to this structure, temperatures in the lower part of cultivation shelf 3 become more uniform. Suction equipment 6 constituted by suction fans 61 is provided in the lower part of cultivation shelf 3, while up-down ducts 62A, branch ducts 62B, left-right ducts 62C, and suction ducts 62D are provided in the upper part of cultivation shelf 3. Air such as cool air staying in the lower region of cultivation space 2 is sucked by suction portions 62E, and guided toward cultivation units 32 in the upper part of cultivation shelf 3 via up-down ducts 62A, branch ducts 62B, left-right ducts 62C, and suction ducts 62D.

According to this structure, air such as cool air staying in the lower part of cultivation space 2 is sucked by suction portions 62E, and guided by up-down ducts 62A, branch ducts 62B, left-right ducts 62C, and suction ducts 62D toward cultivation units 32 disposed in the upper part of cultivation shelf 3. Accordingly, temperatures within respective cultivation units 32 provided on the plurality of stages of cultivation shelf 3 become more uniform by introduction of the cool air in this manner. Cool air generally stays in the lower part, wherefore it is preferable that the suction fans are disposed below the suction ducts. Accordingly, temperatures within respective cultivation units 32 provided on the plurality of stages of cultivation shelf 3 become more uniform by introduction of the cool air in this manner. As noted above, shielding members 36A are provided on the sides of respective cultivation units 32 to increase air conditioning effect.

As described herein, a plant cultivation apparatus according to the present technology includes a cultivation space offering controllable cultivation environment, and a plurality of cultivation shelves provided within the cultivation space. The cultivation space contains an air conditioner disposed in an upper region of the cultivation space and supplying airflow toward the cultivation shelves. The cultivation space further contains an induced draft fan disposed at least at an end of the cultivation space to guide airflow supplied from the air conditioner toward the cultivation shelves. The induced draft fan is configured to guide airflow supplied from the air conditioner toward the cultivation shelves.

In this case, cool air generated from a cooler is supplied to the sides of the cultivation shelves while controlled by the induced draft fan. Accordingly, more uniform air conditioning is realizable. More uniform air conditioning realized in this manner equalizes growth environment of the cultivation units between the upper stage and the lower stage. Accordingly, growth of cultivation plants further improves.

Each of the cultivation shelves includes suction ducts in the upper stage, and suction fans in the lower stage. This structure introduces cool air staying in the lower part toward the upper stage by using the suction ducts, and sucks cool air from the lower stage by using the suction fans. Accordingly, more uniform air conditioning is achievable with simplified structure of the cultivation shelves.

Figure 13:
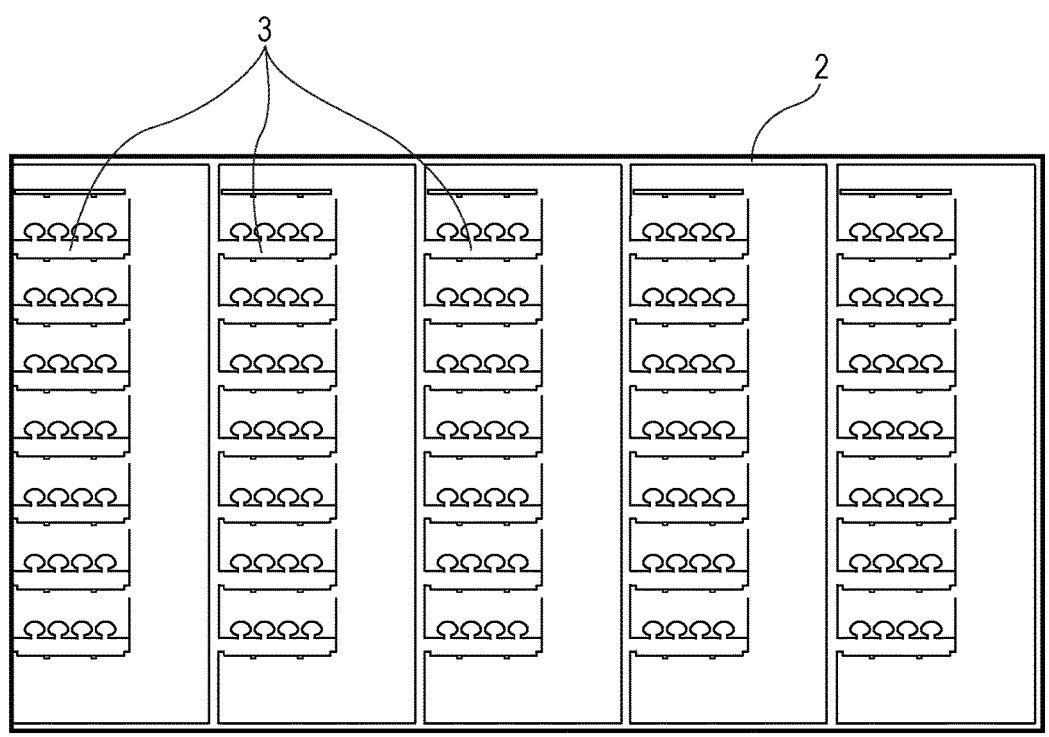
FIG. 13 is an explanatory view illustrating a result of a state simulation of temperature distribution of a cultivation space according to the exemplary embodiment illustrated in FIG. 12.

FIG. 13 is an explanatory view showing a result of a state simulation of temperature distribution in the cultivation space according to the exemplary embodiment illustrated in FIG. 12. Measurement conditions are set as follows.
    temperature of cultivation space 2: 24° C.
    air conditioner 4: air conditioner producing 5 horsepower with outlet temperature of 16° C.
    induced draft fan 5: air supply fan generating wind at 9.2 m/s According to the exemplary embodiment of the present technology, a temperature difference between the upper part and the lower part of cultivation shelf 3 is reduced to a range of ±2° C. While FIG. 13 shows only the result of the configuration according to the exemplary embodiment illustrated in FIG. 12, configurations of the other exemplary embodiments illustrated in FIGS. 1, 10, and 11 can produce similar effects.

As described above, a plant cultivation apparatus according to the present technology includes a cultivation unit. The cultivation unit contains a cultivation bed that includes a recess having a recessed cross-sectional shape and receiving cultivation liquid injected into the recess, and a cultivation plate provided on the cultivation bed. The cultivation plate is supported by the recess of the cultivation bed, and includes an air supply path formed inside the cultivation plate, an air intake port through which air is supplied to the air supply path, and an air discharge port connecting with the air supply path and formed on an upper surface side of the cultivation plate where a cultivation plant is disposed. The cultivation bed includes an air intake port through which air is introduced and guided to the air supply path of the cultivation plate, and an air discharge port connectable with the air intake port of the cultivation plate. The plant cultivation apparatus further includes an elastic member that elastically presses the air intake port of the cultivation plate against the air discharge port of the cultivation bed to connect the air intake port of the cultivation plate and the air discharge port of the cultivation bed.

According to this structure, the air discharge port of the cultivation bed and the air intake port for supplying air to the air supply path of the cultivation plate are securely connectable even when a level of cultivation liquid such as nourishing solution varies. Accordingly, air under temperature control can be supplied to the cultivation plate in a stable manner. Moreover, overflow of cultivation liquid such as nourishing solution toward an upper surface of the cultivation plate is avoidable, wherefore air supplied to the air supply path of the cultivation plate securely reaches the upper surface of the cultivation plate without adverse effect on growth of cultivation plants resulting from overflow of cultivation liquid.

While the first exemplary embodiment has been described by way of example of a technology disclosed according to the present technology, the technology of the present technology is not limited to this example. The technology according to the present technology is applicable to exemplary embodiments including modifications, replacements, additions, omissions and the like. In addition, constituent elements described in the respective exemplary embodiments may be combined to produce new exemplary embodiments.

INDUSTRIAL APPLICABILITY

Accordingly, the present technology is a useful invention which provides an apparatus capable of cultivating plants in a stable cultivation environment.

REFERENCE MARKS IN THE DRAWINGS

1: cultivation facility
2: cultivation space
3: cultivation shelf
3A: cultivation block
4: air conditioner
5: induced draft fan
6: suction equipment
7: liquid
8: cultivation plant
31: support
32: cultivation unit
33: cultivation bed
33A: regulation portion
33B, 33F, 33H: rib
33C: air intake port
33D: air supply path
33E: air discharge port
33G: groove
33I: projection
34: cultivation plate
34A: air supply path
34B: air intake port
34C: air discharge port
34D: cultivation hole
34E: handle
35: illumination device
36A, 36B: shielding member
37: hinge
38: tube
39: hydroponic sheet
61: suction fan
62A: up-down duct
62B: branch duct
62C: left-right duct
62D: suction duct
62E: suction portion

The invention claimed is:
1. A plant cultivation apparatus comprising:
a cultivation unit,
wherein the cultivation unit includes:
a cultivation bed that includes a recess having a recessed cross-sectional shape and being configured to receive cultivation liquid injected into the recess; and
a cultivation plate on the cultivation bed,
wherein the cultivation plate is supported on the recess of the cultivation bed, and includes:
an air supply path defined inside the cultivation plate;
an air intake port through which air is to be supplied to the air supply path; and
an air discharge port connected with the air supply path and defined on an upper surface side of the cultivation plate where a cultivation plant is to be disposed,
wherein the cultivation bed
includes a first rib with an air intake port through which air is to be introduced and guided to the air supply path of the cultivation plate and
an air discharge port connectable with the air intake port of the cultivation plate,
wherein the plant cultivation apparatus further
comprises an elastic member configured to elastically press the cultivation plate against the first rib to connect the air intake port of the cultivation plate and the air discharge port of the cultivation bed,
wherein the elastic member is in a groove defined in a second rib on an opposite side of the cultivation bed from the first rib.

2. The plant cultivation apparatus according to claim 1, wherein injection of the cultivation liquid into the cultivation bed is conducted such that a level of the cultivation liquid does not reach an upper surface of the cultivation plate.

3. The plant cultivation apparatus according to claim 1, wherein the air intake port of the cultivation plate is at a position higher than a level of the cultivation liquid injected into the cultivation bed.

4. The plant cultivation apparatus according to claim 1, wherein an opening diameter of the air discharge port of the cultivation bed is larger than an opening diameter of the air intake port of the cultivation plate.

5. The plant cultivation apparatus according to claim 1, wherein a bottom portion of the cultivation bed includes a projection.

6. The plant cultivation apparatus according to claim 1, wherein:
the elastic member is a tube made of rubber, and
the tube is configured to expand by supply of air into the tube so as to elastically press the air intake port of the cultivation plate against the air discharge port of the cultivation bed for connection between the air intake port of the cultivation plate and the air discharge port of the cultivation bed.

* * * * *